3,230,247
PREPARATION OF NITROSUBSTITUTED ESTERS BY TRANSESTERIFICATION

Marion E. Hill, Kensington, Md., assignor to the United States of America as represented by the Secretary of the Navy
No Drawing. Filed Oct. 17, 1956, Ser. No. 616,578
3 Claims. (Cl. 260—476)
(Granted under Title 35, U.S. Code (1952), sec. 266)

This application is a continuation-in-part of my copending application Serial No. 514,402, filed June 9, 1955 and now abandoned.

The invention described herein may be manufactured and used by or for the Government of the United States of America for governmental purposes without the payment of any royalties thereon or therefor.

This invention relates to the production of organic esters. More particularly the invention relates to the production of highly nitrated esters of polynitro alcohols by a new and useful transesterification reaction between negatively substituted alcohols and negatively substituted organic esters.

With the recent discovery that the highly nitrated esters of polynitro alcohols form a new class of powerful high explosives, attempts have been made to produce these esters more quickly and easily, at lower cost, and from more readily available raw materials. Of particular interest is the compound 2,2,2-trinitroethyl-4,4,4-trinitrobutyrate hereinafter referred to as TNETB. This compound is a stable explosive having a very high oxygen content. As a pure compound or in admixture with 30 percent by weight of aluminum powder it is better than conventional explosives such as RDX and TNT in underwater applications. TNETB is castable and for this reason is useful in a 30/70 mixture with aluminum as the main charge in mines and torpedoes. This mixture is also more efficient in airblast effect than conventional explosives and is therefore useful in warheads of guided missiles.

TNETB and similar esters of 2,2,2-trinitroethanol have previously been prepared by the reaction of the polynitro alcohol with an acid chloride in the presence of a catalyst as disclosed in application Serial No. 585,591, filed May 17, 1956, by the present inventor. This process while successful has the obvious disadvantage of requiring the preparation of an acid chloride before the esterification step. This requires extra expenditures for labor, equipment and materials. In addition there are some instances where it is costly to use an organic acid as a starting material.

It has long been known that when some organic esters are heated with certain alcohols, either in solution in the alcohol or in an inert solvent, in the presence of a catalytic amount of an acid or an alkali that a double decomposition takes place and a new ester and alcohol are formed. This process, called transesterification or alcoholysis, is presumed to proceed according to the following general equation:

$$RCOOR' + ROH \leftrightharpoons R'OH + RCOOR''$$
[I]

wherein R, R' and R'' are alkyl groups.

It has been found, however, that this transesterification reaction does not take place with many combinations of esters and alcohols. Where the starting alcohol is negatively substituted in the beta position or the starting ester is negatively substituted in the acyl portion there is little if any transesterification. This is particularly true if the esters and alcohols are substituted with nitro groups. Where both ester and alcohol are negatively substituted no reaction whatsoever takes place. For example, attempts to transesterify methyl trinitrobutyrate with alcohols such as 2,2,2-trinitroethanol and 2,2-dinitropropanol by mixing and heating in the presence of a catalytic amount of concentrated sulfuric acid are completely unsuccessful and no reaction occurs. This transesterification reaction as disclosed in the prior art, therefore, cannot be used to prepare highly nitrated esters such as TNETB from esters such as methyl trinitrobutyrate and alcohols such as trinitroethanol.

Accordingly it is an object of the present invention to provide a new and useful process for the production of organic esters.

Another object is to provide a new and useful process for the production of negatively substituted organic esters.

A further object is to provide a new and useful process for the production of negatively substituted organic esters from negatively substituted alcohols and esters negatively substituted in the acyl portion.

Another object is to provide a process for the production of polynitro substituted organic esters from polynitro alcohols and esters substituted in the acyl portion with nitro groups.

A further object is to provide a process for the preparation of 2,2,2-trinitroethyl-4,4,4-trinitrobutyrate.

Still another object is to provide a process for the preparation of polynitro substituted esters more simply and easily than is possible by prior art processes.

Other objects and the attendant advantages of the invention will become apparent to those skilled in the art as the invention is disclosed in the following detailed description.

I have found that esters negatively substituted in the acyl portion may be caused to transesterify with alcohols negatively substituted in the beta position if they are mixed and heated in a solvent which consists of anhydrous fuming sulfuric acid containing a small percentage of free sulfur trioxide.

In preparing esters according to the process of the invention the starting ester is dissolved at room temperature in the anhydrous fuming sulfuric acid. The alcohol is then added and the reaction solution is heated to 65–80° C. for 3–4 hours. The product ester is removed from the system by precipitation, extraction, separation or by other suitable means.

The reaction of the invention appears to involve a series of equilibria and is successful because the equilibria in the system lie towards the desired ester. The initial step in the reaction appears to be the cleavage of the starting ester into the protonated acid ion and an alkyl hydrogen sulfate. This cleavage is believed to take place in accordance with the following general equation:

$$RO\text{—}CO\text{—}R' + 2H_2SO_4 \leftrightharpoons ROSO_3H + R'C\!=\!O^+ + HSO_4^-$$

This equilibrium lies far to the right for most of the esters studied. In the second step the acid ion reacts with the alcohol to produce the ester $$R'C\!=\!O^+ + R''OH \leftrightharpoons R'COOR'' + H^+$$

The reaction may also be written as follows:

$$RO\text{—}OC\text{—}R' \xrightleftharpoons{H_2SO_4 + SO_3} ROSO_3H + R'C\!=\!O^+$$

$$R'CO^+ + R''OH \xrightleftharpoons{H_2SO_4 + SO_3} R'COOR'' + H^+$$

The cleavage step is the slow step in the transesterification process. In 100 percent sulfuric acid the reaction is slow. The rate of the reaction increases as free sulfur trioxide is added to the acid until an optimum proportion [2.5 moles to 5.0 moles of the starting ester] is reached. Further increase in the proportion of sulfur trioxide becomes increasingly detrimental to the reaction as the sulfur trioxide also aids in the decomposition of the product. Thus it is desirable to have only sufficient free sulfur trioxide in the system to aid the cleavage of the starting ester and to maintain an anhydrous system.

The system is preferably anhydrous for any water which is present will tend to combine with the acid ion formed by the cleavage of the ester thus forming an acid and interfering with the formation of the desired ester.

The optimum temperature for the reaction is between that necessary for the ionization of the ester and that which would induce the decomposition of the product. At room temperature the speed of the reaction is extremely slow. The reaction time runs from about 3 hours at 75° C. to 5 hours at 70° C. A temperature of at least 65° C. must be maintained for a good rate of reaction. Excess of the alcohol or the starting ester does not increase the yield to any substantial amount.

The concentration of the reactants also influences the reaction. A concentration of 2 grams of reactants to 5 grams of the acid solvent appears to give the best results.

The optimum procedure for the synthesis of TNETB from methyl trinitrobutyrate consists in heating for 3 hours at 75° C. a one molal solution of trinitroethanol and methyl trinitrobutyrate in 4% oleum. The product precipitates from the solution and is easily isolated by pouring the reaction mixture on ice, filtering and recrystallizing. The reaction proceeds according to the following equation:

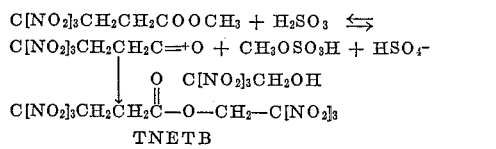

TNETB

The reaction may be adapted to a continuous system through the re-use of the sulfuric acid by refortifying the acid with 65% oleum. Build up of the quantity of impurities, however, limits the re-use of the acid.

The yield of the reaction may be increased if the ester formed changes to its unionized form by proton elimination and drive the reaction to completion. If not the yield is governed by the extent to which the ester which is formed is in equilibrium with its cleavage products. In the case of TNETB the comparatively low basicity of the acyl group aids the precipitation from the solution and shifts the equilibrium of the reaction towards its continued formation. If the overall acidity of the system is high the basicity of the acyl group of the starting ester is enhanced and transesterification is aided. Thus alcohols having acidic properties such as trinitroethanol by increasing the acidity of the system tend to aid in the formation of their esters. This is particularly important where the starting ester is acidic due to the substituents such as methyl trinitrobutyrate.

The following examples are given by way of illustration and are not to be considered as limiting the invention in any manner.

EXAMPLE I

Preparation of trinitroethyl trinitrobutyrate

To 50 g. of fuming sulfuric acid containing 4% free sulfur trioxide by weight was added 11.9 g. of methyl trinitrobutyrate and 9.1 g. of trinitroethanol. The reaction vessel was placed in a hot water bath and held at a temperature of 70–75° C. for three hours and then cooled to room temperature. Seeding the reaction mixture with trinitroethyl trinitrobutyrate crystals after the first two hours of the reaction period induced crystallization of the product. After standing several hours, the crude product was filtered from the reaction mixture and washed successively with concentrated sulfuric acid, 40% sulfuric acid, and water. The trinitroethyl trinitrobutyrate thus obtained melted at 91–92° C. and was unchanged after mixing with the pure known compound.

Analysis.—Calculated for $C_6H_6N_6O_{14}$: C, 18.66%; H, 1.57%. Found: C, 18.70%; H, 1.50%.

EXAMPLE II

Preparation of trinitroethyl benzoate

A solution of 27.2 g. of methyl benzoate and 36.2 g. of trinitroethanol in 150 g. of 5.4% oleum was prepared at room temperature. The reaction vessel was placed in a hot water bath and held at 50–52° C. for a period of five hours, and then cooled before pouring onto cracked ice. The solid product deposited thereby was filtered, washed with $NaHCO_3$ solution, and dried. The trinitroethyl benzoate thus obtained melted at 76–77° C. and the melting point remained unchanged when mixed with authentic trinitroethyl benzoate.

Analysis.—Calculated for $C_9H_7N_3O_8$: C, 37.90%; H, 2.55%. Found: C, 37.80%; H, 2.33%.

EXAMPLE III

Preparation of bis [trinitroethyl] fumarate

A solution of 14.4 g. of dimethyl fumarate and 40 g. of trinitroethanol in 100 g. of 3.5% oleum was prepared at room temperature. The reaction vessel was placed in a hot water bath and held at 65° C. for a period of 4½ hours. After cooling the reaction mixture, bis [trinitroethyl] fumarate was isolated as in Example II.

Analysis.—Calculated for $C_8H_6N_6O_{16}$: C, 21.73%; H, 1.37%. Found: C, 21.74%; H, 1.40%.

EXAMPLE IV

Preparation of trinitroethyl trinitrobutyrate

A solution of 8.6 g. of methyl acrylate in 50 g. of 3.5% oleum was prepared with cooling, and then 18.1 g. of trinitroethanol was added thereto. This solution was heated at 54–72° C. for two hours, then cooled, poured onto cracked ice. To this suspension of crude trinitroethyl acrylate was added 15.0 g. of nitroform and 250 ml. of methanol. Crystalline trinitroethyl trinitrobutyrate having a melting point of 90° C. was isolated from the reaction mixture after standing two days.

EXAMPLE V

Preparation of trinitroethyl trinitrobutyrate

A solution of 23.7 g. of methyl trinitrobutyrate in 100 g. of 3.5% oleum was heated at a temperature of 75° C. for a period of 1½ hours to achieve cleavage of the ester, then 18.1 g. of trinitroethanol added and the solution held at 48–50° C. for an additional period of 3 hours. During this second heating period oiling out and then crystallization occurred after the first 40 minutes. The reaction solution was cooled and the trinitroethyl trinitrobutyrate product isolated in the manner of Example I.

EXAMPLE VI

Preparation of dinitropropyl trinitrobutyrate

A solution of 23.7 g. of methyl trinitrobutyrate in 100 g. of 3.5% oleum was heated at a temperature of 75° C. for a period of 1 hour to achieve cleavage of the ester, then 150 g. of 2,2-dinitropropanol was added and the solution held at a temperature of 70° C. for an additional period of 1 hour. Dinitropropyl trinitrobutyrate, M.P. 93–93.7, was then isolated as in Example II.

Analysis.—Calculated for $C_7H_9N_5O_{12}$: C, 23.67%, H, 2.55%. Found: C, 23.76%, H, 2.31%.

EXAMPLE VII

Preparation of trinitroethyl trinitrobutyrate

A solution of 12.5 g. of ethyl trinitrobutyrate and 9.2 g. of trinitroethanol in 50 g. of 2.7% oleum was heated at a temperature of 75–85° C. for one hour, and then the temperature was raised to 75° C. for an additional period of two hours. After cooling and standing for several hours, the trinitroethyl trinitrobutyrate product was isolated as in Example I [M.P. 91–92° C.].

EXAMPLE VIII

*Preparation of trinitroethyl benzoate*

1.90 g. of trinitroethanol was dissolved in 10 g. of 100% sulfuric acid at room temperature, and then 1.97 g. of phenyl benzoate was added with cooling. The reaction mixture was allowed to stand 5 minutes at room temperature before pouring over cracked ice. The trinitroethyl benzoate thus obtained was filtered off, treated with sodium bicarbonate solution, and then dried. Trinitroethyl benzoate prepared by the foregoing method did not depress the melting point of a sample of known trinitroethyl benzoate.

From the foregoing it may be seen that a new and useful process has been provided whereby negatively substituted organic esters may be quickly and easily prepared from readily available inexpensive materials.

Obviously the invention pertains to reactions between alcohols and esters other than those specifically described. It is, therefore, to be understood that the invention is limited only by the scope of the appended claims.

What is claimed as new and desired to be secured by Letters Patent of the United States is:

1. A process for the preparation of an organic ester which comprises reacting a solution of an ester selected from the group consisting of methyl benzoate and methyl acrylate in anhydrous sulfuric acid with an alcohol selected from the group consisting of 2,2,2-trinitroethanol and 2,2-dinitropropanol at a temperature between about room temperature and 80° C. to form the corresponding ester.

2. A process for forming trinitroethyl benzoate which comprises reacting a solution of methyl benzoate in anhydrous sulfuric acid with 2,2,2-trinitroethanol at a temperature between about room temperature and 80° C.

3. A process for forming trinitroethyl trinitrobutyrate which comprises reacting a solution of methyl acrylate in anhydrous sulfuric acid with 2,2,2-trinitroethanol at a temperature between about 54° and 72° C.

References Cited by the Examiner

UNITED STATES PATENTS

| 1,770,414 | 7/1930 | Martin et al. | 260—491 |
| 2,659,751 | 11/1953 | Hass et al. | 260—478 |
| 3,160,654 | 12/1964 | Conly | 260—471 |

OTHER REFERENCES

Fieser et al.: Organic Chemistry (1944), D. C. Heath & Co., Boston, pp. 182–183.

LEON ZITVER, *Primary Examiner.*

LEON D. ROSDOL, ROGER L. CAMPBELL,
*Examiners.*

B. R. PADGETT, D. D. HORWITZ, *Assistant Examiners.*